(12) United States Patent
Kawaguti (10) Patent No.: US 11,290,602 B2
(45) Date of Patent: Mar. 29, 2022

(54) INFORMATION PROCESSING DEVICE, INFORMATION PROCESSING SYSTEM, AND INFORMATION PROCESSING METHOD

(71) Applicant: TOSHIBA TEC KABUSHIKI KAISHA, Tokyo (JP)

(72) Inventor: Takesi Kawaguti, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/078,295

(22) Filed: Oct. 23, 2020

(65) Prior Publication Data

US 2021/0266415 A1 Aug. 26, 2021

(30) Foreign Application Priority Data

Feb. 25, 2020 (JP) .............................. JP2020-029734

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ..... *H04N 1/00212* (2013.01); *H04N 1/00214* (2013.01); *H04N 1/00244* (2013.01); *H04N 2201/0094* (2013.01)

(58) Field of Classification Search
CPC .......... H04N 1/00121; H04N 1/00214; H04N 1/00244; H04N 2201/0094

USPC .............................. 358/1.15, 1.13, 1.14, 1.1
See application file for complete search history.

(56) References Cited

U.S. PATENT DOCUMENTS

| 2010/0103450 | A1* | 4/2010 | Yanazume ........... H04N 1/2183 358/1.15 |
| 2013/0024874 | A1  | 1/2013 | Labejof et al. |
| 2017/0041655 | A1* | 2/2017 | Harrison ............ H04N 21/4782 |

FOREIGN PATENT DOCUMENTS

| JP | 2009-152995 | 7/2009 |
| WO | 2017/017200 | 2/2017 |

OTHER PUBLICATIONS

Extended European Search Report for European Patent Application No. 20211966.5 dated Apr. 16, 2021.

* cited by examiner

*Primary Examiner* — Douglas Q Tran
(74) *Attorney, Agent, or Firm* — Amin, Turocy & Watson, LLP (57) ABSTRACT

According to one embodiment, the information processing device shares shared data with another information processing device by exchanging the shared data that does not designate a transmission destination with the other information processing device. The information processing device includes a reception unit, an execution unit, and a publication unit. The reception unit receives first shared data including a first parameter and an execution request for requesting the execution of a first service using the first parameter. The execution unit outputs a first execution result by executing the first service according to the first shared data. The publication unit publishes second shared data including the first execution result.

20 Claims, 9 Drawing Sheets

FIG. 15

INFORMATION PROCESSING DEVICE, INFORMATION PROCESSING SYSTEM, AND INFORMATION PROCESSING METHOD

CROSS-REFERENCE TO RELATED APPLICATION

This application is based upon and claims the benefit of priority from Japanese Patent Application No. 2020-029734, filed Feb. 25, 2020, the entire contents of which are incorporated herein by reference.

FIELD

Embodiments described herein relate generally to an information processing device, an information processing system, and an information processing method.

BACKGROUND

In the related art, embedded devices often cannot hold a large capacity memory, and there is a demand for reducing the number of functions implemented in embedded devices, such as by reducing the size of programs to be installed and the size of data to be stored. On the other hand, if the program size that can be installed and the data size that can be stored are limited, the processing capability such as the type of executable service (process) and the execution speed of the service may be limited.

Under such circumstances, a technology is disclosed that enables a process having a size larger than its own program size to be executed by having a service provided from another device connected via a network. However, in order to receive a service provided from another device via a network, a device that executes the service, that is, a connection destination is required to be designated in advance in a connection setting. The connection setting may require man-hours.

DETAILED DESCRIPTION

The problem to be solved by the present disclosure is to receive a service from another device without designating a connection destination in advance.

In general, according to one embodiment, an information processing device shares shared data with another information processing device by exchanging the shared data that does not designate a transmission destination with the other information processing device. The information processing device includes a reception unit, an execution unit, and a publication unit. The reception unit receives first shared data including a first parameter and an execution request for requesting the execution of a first service using the first parameter. The execution unit outputs a first execution result by executing the first service according to the first shared data. The publication unit publishes second shared data including the first execution result.

Hereinafter, an information processing device, an information processing system, and an information processing method according to each embodiment will be described in detail with reference to the drawings. The present disclosure is not limited to the embodiments described below.

First Embodiment

Figure 1:
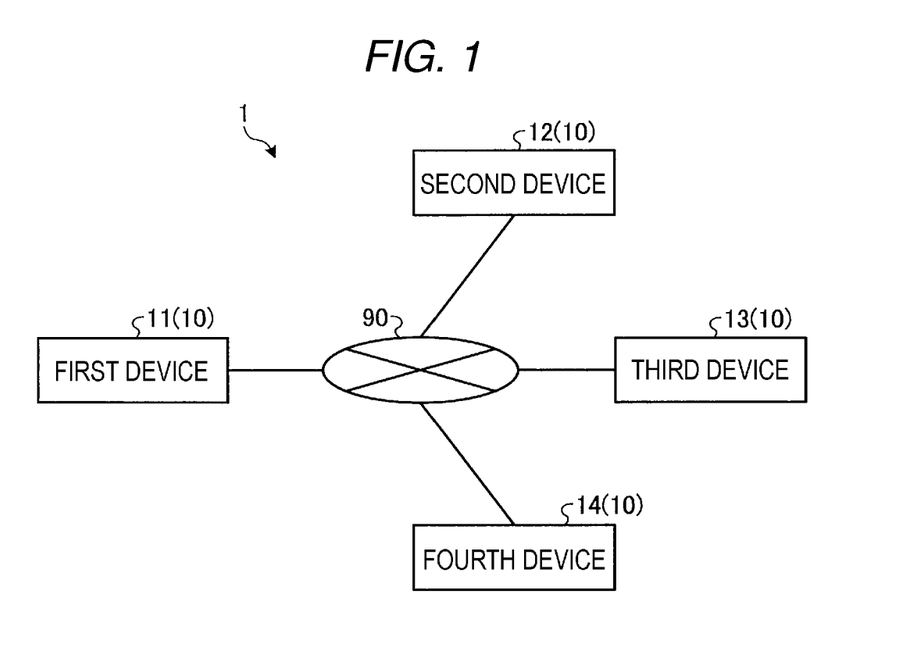
FIG. 1 is a diagram illustrating an example of a configuration of an information processing system according to an embodiment.

FIG. 1 is a diagram showing an example of the configuration of an information processing system 1 according to an embodiment. As shown in FIG. 1, the information processing system 1 includes a plurality of information processing devices 10. FIG. 1 illustrates a first device 11, a second device 12, a third device 13, and a fourth device 14 as the plurality of information processing devices 10. In the following description, if the information processing device 10 is not distinguished among the first device 11, the second device 12, the third device 13, and the fourth device 14, the device may be collectively referred to as the information processing device 10.

The information processing system 1 according to the embodiment is not limited to the four information processing devices 10 (first to fourth devices 11 to 14) and may be configured by two or three information processing devices 10, or five or more information processing devices 10.

As shown in FIG. 1, the plurality of information processing devices 10 are communicably connected to each other via a network 90. The network 90 is a telecommunication line such as the Internet. Each of the plurality of information processing devices 10 may be connected to the network 90 in a wired manner or may be connected to the network 90 in a wireless manner.

In the information processing system 1 according to the embodiment, the information processing device 10 connected to the network 90 via another information processing device 10 may exist.

The information processing system 1 according to the embodiment is a system that shares shared data among the plurality of information processing devices 10 by publishing the data (shared data) among the plurality of information processing devices 10 without designating a transmission destination. In other words, the information processing system 1 according to the embodiment is a system that shares shared data among the plurality of information processing devices 10 by exchanging the shared data that does not designate a transmission destination among the plurality of information processing devices 10. The information processing device 10 according to the embodiment is a device that shares shared data with another information processing device by exchanging the shared data that does not designate a transmission destination with the other information processing device.

As an example, the information processing system 1 according to the embodiment is constructed using a data distribution service (DDS). Here, the data distribution service (DDS) is a publish/subscribe type data communication method and is an example of a distributed object technology-based communication specification. At this time, each information processing device 10 can be expressed as a real time streaming protocol (RTSP) server. By using the DDS for data sharing, real-time and highly reliable data transmission can be realized.

In the information processing system 1 constructed using the DDS, each information processing device 10 operates as a publisher and a subscriber. The information processing device 10 when operating as a publisher publishes data without recognizing the transmission (publication) destination of the data. The information processing device 10 when operating as a subscriber receives data without recognizing the transmission (publication) source of the data. As described above, in the information processing system 1 constructed by using the DDS, each information processing device 10 does not perform communication designating a connection destination but data-centered communication specifying a data attribute. Therefore, it is not necessary to designate the connection destination, and automatic detection, addition, and deletion of the information processing device 10 incorporated in the information processing system 1 can be easily performed.

The information processing system 1 according to the embodiment is not limited to the DDS and may be constructed using an application service provider (ASP).

In the information processing system 1, the shared data published from each information processing device 10 is stored in a virtual database VDB. As the storage area for the virtual database VDB, a memory 120 (see FIG. 2) of each information processing device 10 may be used or an external storage device such as a data server connected to the network 90 may be used. Data publication means the publication of data or the publication of a notification indicating that the data is stored in a predetermined area (virtual database VDB). Data reception means the reception of data or the reception of a notification indicating that the data is stored in a predetermined area.

In the information processing system 1 according to the embodiment, as an example, it is assumed that a plurality of information processing devices 10 having different processing capabilities are mixed. Here, the processing capability refers to the types of executable services, the execution speed of the service, and the like. The service means a function or a process executed by the information processing device 10.

The information processing system 1 may include at least two information processing devices 10 in which at least one out of the type of executable service and the execution speed of the service are the same (similar level). In the information processing system 1, at least one out of the types of services that can be executed by all the information processing devices 10 and the execution speed of the services may be the same (similar level).

In the information processing system 1 according to the embodiment, any information processing device 10 can receive the service provided from another information processing device 10 via the network 90. Similarly, any information processing device 10 can provide a service to another information processing device 10 via the network 90. That is, the information processing system 1 according to the embodiment is a distributed processing system that distributes services among a plurality of information processing devices 10 and executes services. In other words, the information processing system 1 according to the embodiment is a distributed processing system using a publish/subscribe type data communication method in which a plurality of information processing devices 10 having different processing capabilities are mixed.

Figure 2:
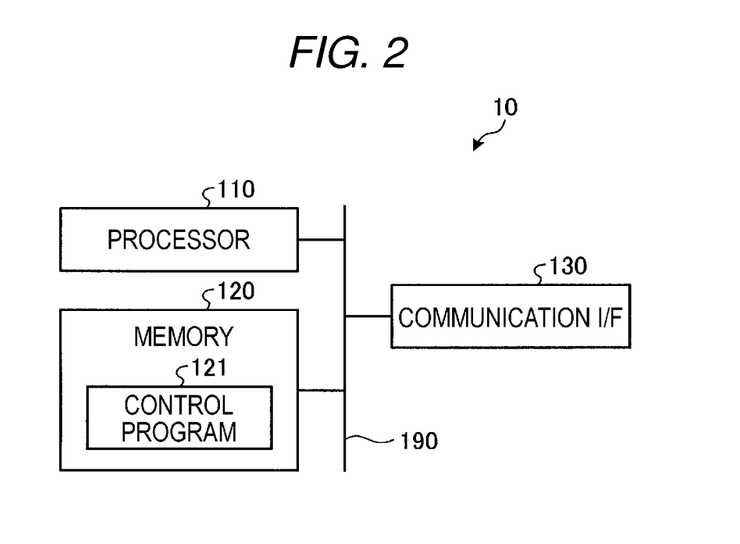
FIG. 2 is a block diagram illustrating an example of a hardware configuration of an information processing device according to the embodiment.

FIG. 2 is a block diagram showing an example of the hardware configuration of the information processing device 10 according to the embodiment. As illustrated in FIG. 2, the information processing device 10 includes a processor 110, a memory 120, and a communication I/F 130. The processor 110, the memory 120, and the communication I/F 130 are communicably connected via a bus 190, for example.

The processor 110 controls the overall operation of the information processing device 10. The processor 110 controls the operation of the information processing device 10 by executing each program such as the control program 121 stored in the memory 120. As the processor 110, for example, a central processing unit (CPU) is used, but other processors such as a graphics processing unit (GPU), an application specific integrated circuit (ASIC), and a field programmable gate array (FPGA) may also be used.

The memory 120 includes, for example, a random access memory (RAM), a read only memory (ROM), and a hard disk drive (HDD). The RAM is a volatile memory that is used as a working memory and stores data when the processor 110 executes arithmetic processing. The ROM is a non-volatile memory that stores each program such as the control program 121 executed by the processor 110 and data such as parameters. The HDD is a non-volatile memory that stores each program such as the control program 121 executed by the processor 110 and data such as parameters. The memory 120 of each information processing device 10 can be used as a storage area for the virtual database VDB.

The memory 120 may not have the HDD. On the other hand, the memory 120 may have other non-volatile memories such as a solid state drive (SSD) and a flash memory. Here, each program such as the control program 121 executed by the processor 110 and data such as parameters may be stored in the other nonvolatile memory.

The communication I/F 130 is a communication circuit that communicates with another information processing device 10 via the network 90. The communication I/F 130 may be a communication circuit for wired communication or a communication circuit for wireless communication.

The information processing device 10 may further include a unique function unit that executes a unique function. As an example, when the information processing device 10 is an imaging device such as a camera, the information processing device 10 further includes an imaging unit that captures images and outputs image data. As an example, when the information processing device 10 is a commodity reading device, the information processing device 10 further includes a reading unit that reads a code symbol such as a barcode or a two-dimensional code attached to a commodity or a digital watermark based on the image data, or reads information regarding the commodity by extracting feature data of the commodity and performing object recognition.

Figure 3:
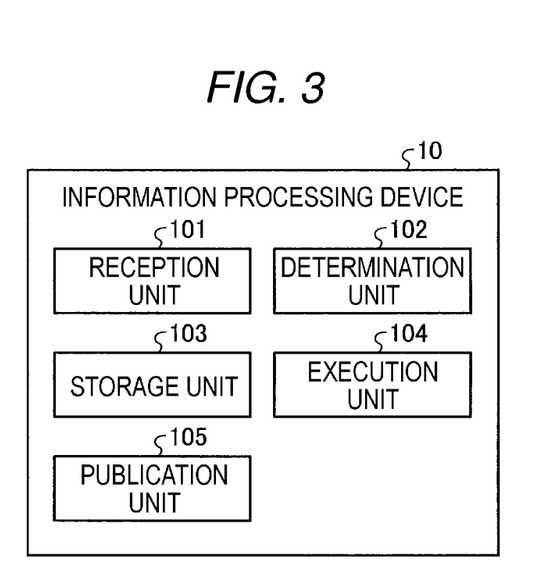
FIG. 3 is a block diagram showing an example of a functional configuration of the information processing device.

FIG. 3 is a block diagram showing an example of the functional configuration of the information processing device 10 according to the embodiment. The processor 110 realizes the functions as the reception unit 101, the determination unit 102, the storage unit 103, the execution unit 104, and the publication unit 105 by executing the control program 121 loaded in the RAM of the memory 120.

The reception unit 101 receives a topic (shared data) published to the virtual database VDB from the publication unit 105 of another information processing device 10, that is, the publisher. That is, the reception unit 101 can be expressed as a function of the information processing device 10 when operating as a subscriber.

The determination unit 102 determines whether the service requested by the received topic can be executed in its own device, for example, based on the processing capability of its own device. The determination unit 102 determines whether to execute the service requested by the received topic in its own device, for example, based on the priority of each information processing device 10 regarding each service.

The storage unit 103 stores each program such as the control program 121 executed by the information processing device 10 and data such as parameters. The storage unit 103 also stores topics received or adopted.

The execution unit 104 executes the service requested to be executed according to the received topic (shared data). More specifically, the execution unit 104 executes the service determined to be executed in its own device.

The publication unit 105 publishes a topic including a service execution request to the virtual database VDB based on, for example, the processing capability of its own device. The publication unit 105 publishes a topic including the execution result of the service executed by the execution unit 104 to the virtual database VDB. That is, the publication unit 105 can be expressed as a function of the information processing device 10 when operating as a publisher.

Hereinafter, an example of the operation of the information processing system 1 according to the embodiment will be described with reference to FIGS. 4 to 11.

Figure 4:
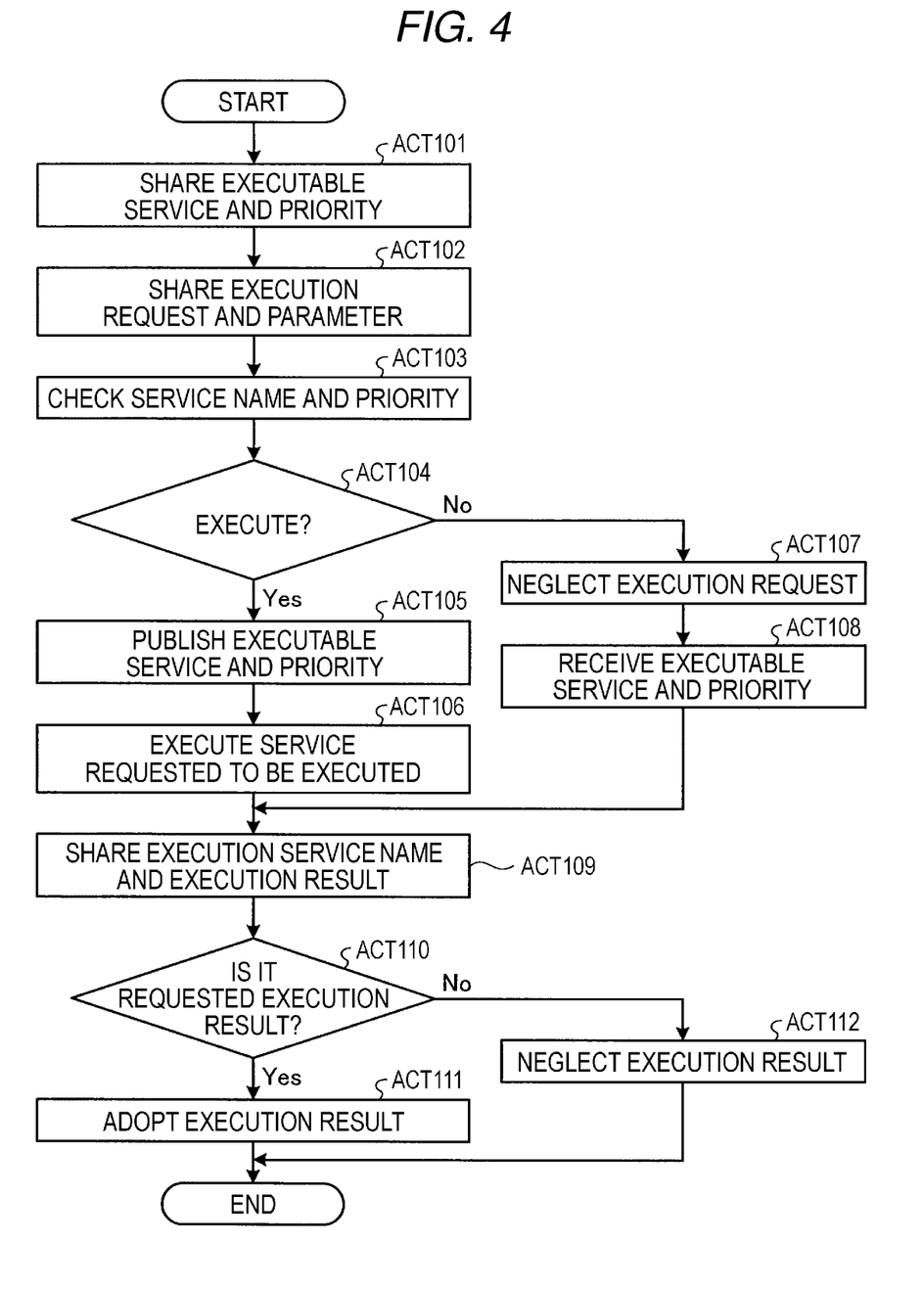
FIG. 4 is a flowchart showing an example of processing executed by the information processing device.

FIG. 4 is a flowchart showing an example of processing executed by the information processing device 10 according to the embodiment.

Here, the first device 11 is assumed to be an information processing device 10 that requests the provision of a service FAA among the plurality of information processing devices 10. The first device 11 is, for example, an information processing device 10 that cannot execute the service FAA. The first device 11 is, as another example, an information processing device 10 capable of executing the service FAA but is the information processing device 10 in a state where the service FAA cannot be executed due to lack of resources at the time of requesting the service. The second device 12 is assumed to be an information processing device 10 capable of executing a plurality of services including the service FAA, a service FAB, . . . , a service FAN. Each of the third device 13 and the fourth device 14 is assumed to be an information processing device 10 capable of executing at least the service FAA. Here, the service FAA is an example of a first service.

Figure 5:
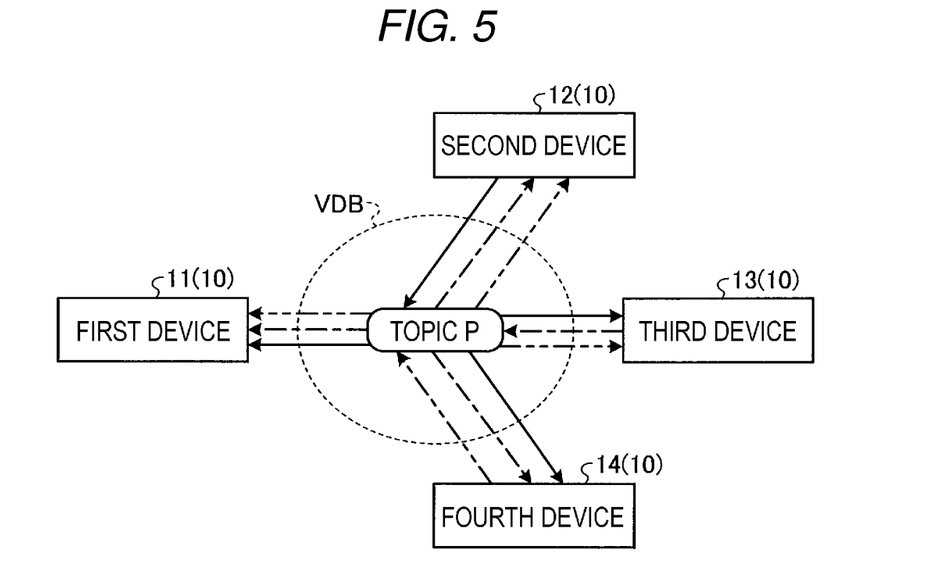
FIG. 5 is a diagram for illustrating the sharing of priorities in the information processing system.

The plurality of information processing devices 10 share executable services and priorities (ACT 101). FIG. 5 is a diagram for illustrating the sharing of priorities in the information processing system 1 according to the embodiment. As shown in FIG. 5, the publication unit 105 of each information processing device 10 as a publisher publishes a topic P (shared data) to the virtual database VDB. The reception unit 101 of each information processing device 10 as a subscriber receives the topic P published from each of the plurality of information processing devices 10 from the virtual database VDB.

Figure 6:
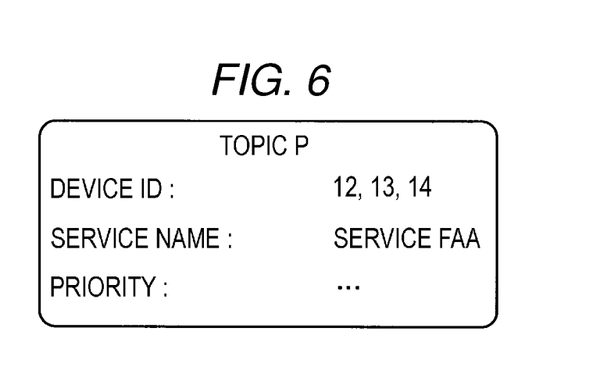
FIG. 6 is a diagram for illustrating data including a priority, which is shared in the information processing system.

The topic P is shared data including a service that can be executed by its own device and information indicating the priority regarding the execution of the service in its own device. Here, the topic P is an example of fifth shared data. FIG. 6 is a diagram for illustrating the data (topic P) including the priority, which is shared in the information processing system 1 according to the embodiment. FIG. 6 exemplifies the topic P including information indicating the priority regarding the execution of the service FAA. The topic P includes a service name, a device ID, and a priority, as shown in FIG. 6. The service name is information indicating that the topic P is related to the service FAA. The device ID is information indicating the information processing device 10 that can execute the service FAA. The priority is information indicating the priority regarding the execution of the service FAA in each information processing device 10. The priority may be set in advance and stored in the memory 120 or the like of each information processing device 10 according to, for example, the execution speed of each service of each information processing device 10. Although the details will be described later, the information indicating the priority can be changed according to the processing capability of each information processing device 10 at each time point.

The topic P is provided for each service as an example, but is not limited thereto. The topic P may be provided for a plurality of services. A plurality of topics may be grouped by further including a group name, for example.

The topic P may include information regarding the information processing device 10 that cannot execute the service as the information processing device 10 having the lowest priority.

Figure 7:
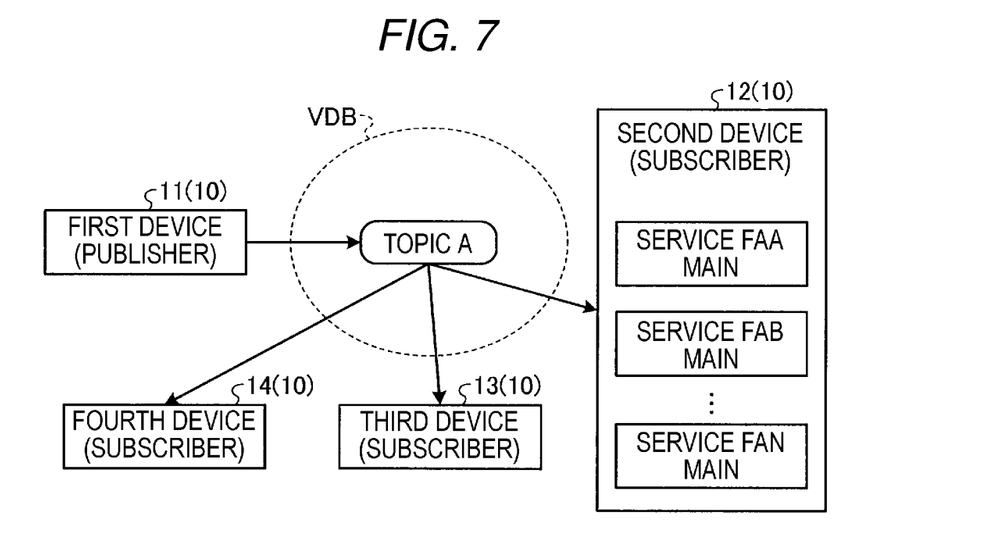
FIG. 7 is a diagram for illustrating a service execution request in the information processing system.

The plurality of information processing devices 10 share the execution request and the parameter (ACT 102). FIG. 7 is a diagram for illustrating a service execution request in the information processing system 1 according to the embodiment. As shown in FIG. 7, the publication unit 105 of the first device 11 as the publisher requesting the provision of the service FAA publishes topic A (shared data) to the virtual database VDB. Respective reception units 101 of the second to fourth devices 12 to 14 as subscribers receive the topic A published from the first device 11 from the virtual database VDB.

Figure 8:
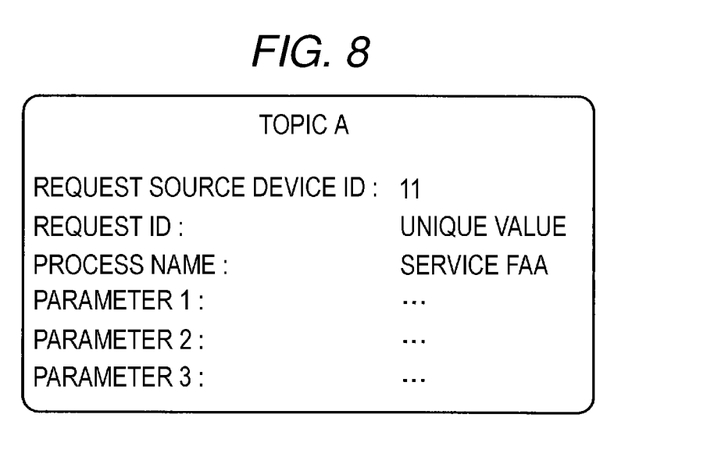
FIG. 8 is a diagram for illustrating data including a service execution request, which is shared in the information processing system.

The topic A is shared data including an execution request for requesting the execution of the service FAA and parameters used for the execution of the service FAA. Here, the topic A is an example of the first shared data. The parameter used to execute the service FAA is an example of the first parameter. FIG. 8 is a diagram for illustrating data (topic A) including a service execution request, which is shared in the information processing system 1 according to the embodiment. As shown in FIG. 8, the topic A includes a request source device ID, a request ID, a process name, and at least one parameter. The request source device ID is information indicating the information processing device 10 that requested the execution of the service FAA. The request ID is information for uniquely identifying a series of topics related to the service FAA. The process name is information indicating a service (service FAA) that is requested for the execution. At least one parameter is information used for executing the service FAA. Although FIG. 8 exemplifies three parameters, the number of parameters is set arbitrarily according to the service, for example.

The determination unit 102 of each information processing device 10 checks the service name requested to be executed and the priority based on the shared data (topic P and topic A) (ACT 103). In the information processing system 1 according to the embodiment, as described above, the data (topic P) regarding the execution of each service is shared (published and received) among the plurality of information processing devices 10, and thus each determination unit 102 can easily check the existence of another device capable of executing (providing) the service requested to be executed and the priority of the other device regarding the service.

The determination unit 102 of each information processing device 10 determines whether to execute the service FAA requested to be executed in its own device, for example, based on the processing capability and the priority of its own device (ACT 104). Each determination unit 102 determines to execute the service FAA in its own device when its own device is capable of executing the service FAA and the priority of its own device regarding the service FAA is the highest, for example.

Each determination unit 102 may determine whether it is the topic A published by its own device based on the request ID of the topic A and the request source device ID. Each determination unit 102 may determine that the service FAA is to be executed in its own device when its own device has the highest priority and is executable by its own device although it is the topic A published by its own device. Each determination unit 102 may determine to withdraw the execution request of the service FAA when there is no other device capable of executing the service FAA although it is the topic A published by its own device. Here, the first device 11 that published the topic A including the execution request of the service FAA may present to the user by display or voice output that a time error occurred, that there is no device capable of executing the service FAA, that the service FAA cannot be used, or the like. The withdrawal of the execution request of the service FAA is executed by, for example, the publication of shared data (topic) requesting the suspension of the execution of the service FAA. Alternatively, the withdrawal of the execution request of the service FAA is executed by deleting the topic A, for example.

Hereinafter, it is assumed that the second device 12 has the highest priority regarding the service FAA at the time of determination in ACT 104.

Figure 9:
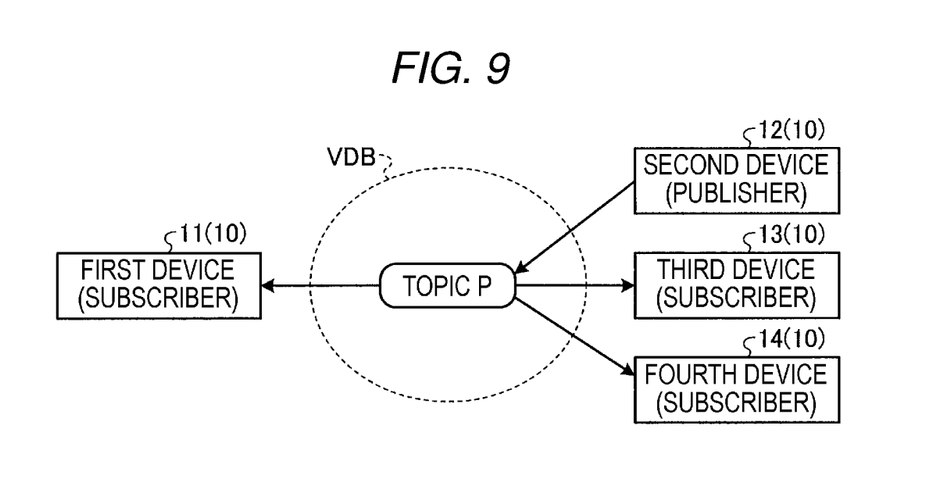
FIG. 9 is a diagram for illustrating the priority change in the information processing system.

When it is determined that the service FAA is to be executed in its own device (ACT 104: Yes), that is, the publication unit 105 of the second device 12 republishes the topic P in which the priority of its own device is updated (ACT 105). FIG. 9 is a diagram for illustrating the priority change in the information processing system 1 according to the embodiment. The publication unit 105 of the second device 12 as the publisher publishes the topic P (shared data) regarding each service in which the priority of its own device is lowered to the virtual database VDB. Thereby, while the second device is executing the service FAA, the other information processing device 10 can respond to another service request. That is, by appropriately distributing respective services, it is possible to improve the processing efficiency of the information processing system 1 as a whole. The execution unit 104 of the second device 12 executes the service FAA (ACT 106).

The period during which the priority of the information processing device 10 that executes a service is lowered is not limited to the period during which the service is being executed, and may include a predetermined period after the service is executed. As a result, the concentration of service requests on one information processing device 10 can be prevented.

On the other hand, when it is determined that the service FAA is not executed in its own device (ACT 104: No), that is, each determination unit 102 of the first, third, and fourth devices 11, 13, and 14 neglects the received topic A (ACT 105). Respective reception units 101 of the first, third, and fourth devices 11, 13, and 14 as subscribers receive the topic P republished in ACT 105, for example (ACT 108). Thereby, each information processing device 10 can execute the determination of ACT 104 according to the latest priority when a topic requesting the execution of another service is newly received.

Figure 10:
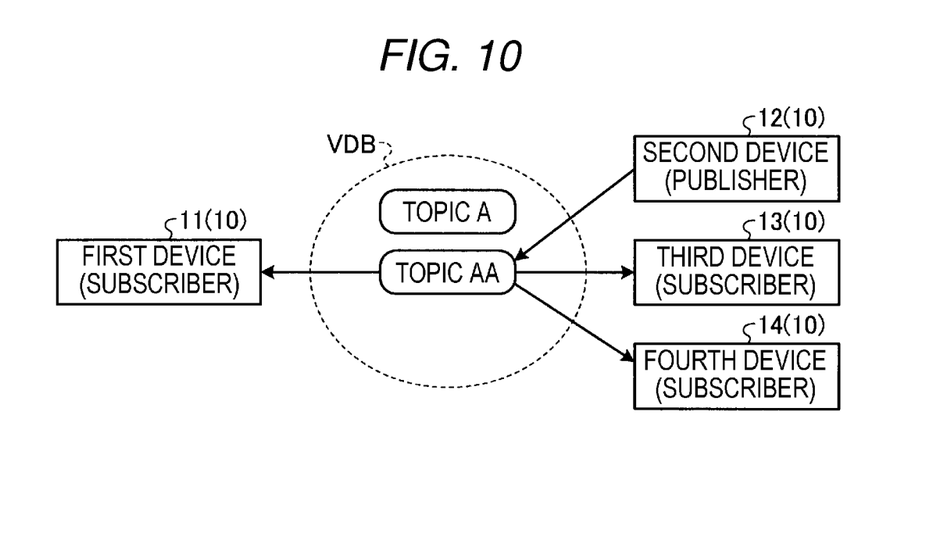
FIG. 10 is a diagram for illustrating the sharing of a service execution result in the information processing system.

The plurality of information processing devices 10 share the execution service name and the execution result after the execution of the service FAA by the execution unit 104 of the second device 12 (ACT 109). FIG. 10 is a diagram for illustrating the sharing of a service execution result in the information processing system 1 according to the embodiment. As shown in FIG. 10, the publication unit 105 of the second device 12 that executed the service FAA publishes, as a publisher, topic AA (shared data) to the virtual database VDB. Respective reception units 101 of the first, third, and fourth devices 11, 13, and 14 receive, as subscribers, the topic AA published from the second device 12 from the virtual database VDB.

Figure 11:
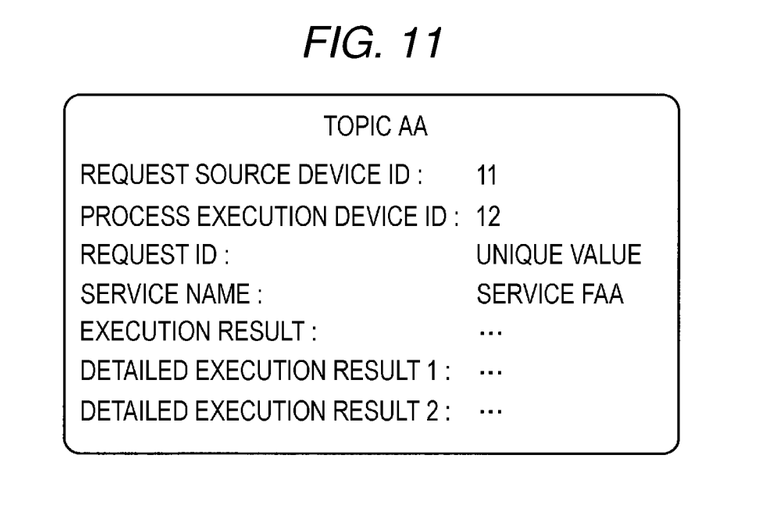
FIG. 11 is a diagram for illustrating data including a service execution result, which is shared in the information processing system.

The topic AA is shared data including the execution result of the service FAA. Here, the topic AA is an example of the second shared data. The execution result of the service FAA is an example of the first execution result. FIG. 11 is a diagram for illustrating data (topic AA) including the service execution result, which is shared in the information processing system 1 according to the embodiment. As shown in FIG. 11, the topic AA includes a request source device ID, a process execution device ID, a request ID, a service name, and an execution result. The process execution device ID is information indicating the information processing device 10 that executed the service FAA. The execution result is a processing result obtained by executing the service FAA. As shown in FIG. 11, the topic AA may further include, as the execution result, a detailed execution result that describes the execution result in more detail. As an example, Although FIG. 11 exemplifies two detailed execution results, the number of detailed execution results is set arbitrarily according to the service, for example.

The determination unit 102 of each information processing device 10 determines whether the topic AA is data related to the service FAA requested to be executed by its own device (execution result), for example, based on the request ID of the received shared data (topic AA) and the request source device ID (ACT 110). When the topic AA is the execution result related to the service FAA requested to be executed from its own device (ACT 110: Yes), that is, the execution unit 104 of the first device 11 adopts the execution result of the topic AA as the execution result of the service requested by its own device (ACT 111). Here, the storage unit 103 of the first device 11 stores the received topic AA. On the other hand, when the topic AA is not the execution result related to the service FAA requested to be executed from its own device (ACT 110: No), that is, each execution unit 104 of the second to fourth devices 12 to 14 neglects the execution result, that is, the received topic AA. After that, the series of flows related to the service FAA ends.

As described above, the information processing device (publisher) of the first embodiment performs a service request by publishing shared data (topic) including a service execution request and parameters to another information processing device 10 (subscriber) without designating a transmission destination. The information processing device 10 (subscriber) that received the service execution request operates as a publisher device after executing the requested service, and publishes the shared data (topic) including the execution result to another information processing device 10 (subscriber) without designating a transmission destination.

With such configuration, each information processing device 10 can provide services via the network 90 (DDS). Therefore, the functions (services) installed in each information processing device 10 can be reduced. In other words, it is possible to reduce the memory capacity of each information processing device 10 that stores programs and data. Therefore, according to the technology according to the embodiment, it is possible to reduce the functions to be installed on the embedded device. In the information processing system 1 according to the embodiment, it is not necessary to designate a connection destination. Therefore, each information processing device 10 can receive a service provided from another information processing device 10 without designating a connection destination in advance. In addition, since it is not necessary to set a connection destination in advance, it is possible to reduce the man-hours involved in the introduction.

Second Embodiment

In the first embodiment, the case where the service FAA is executed by one information processing device 10 (second device 12) having the highest priority was described but the present disclosure is not limited thereto. For example, there may be a case where a plurality of information processing devices 10 have the same priority (similar level).

Figure 12:
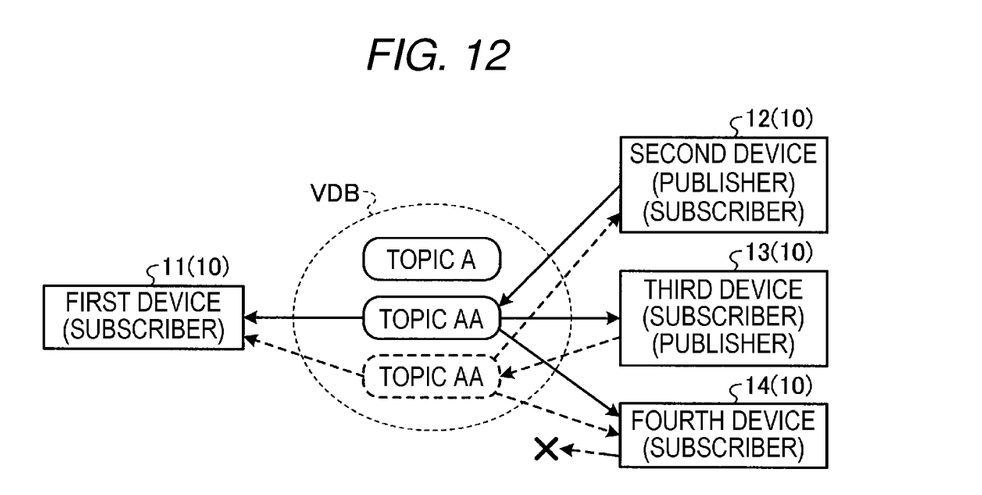
FIG. 12 is a diagram for illustrating the execution of a service in the information processing system when there are a plurality of information processing devices having the same priority.

FIG. 12 is a diagram for illustrating the execution of the service FAA in the information processing system 1 according to the embodiment when there are a plurality of information processing devices 10 having the same priority. As an example, it is assumed that the priorities regarding the service FAA at the time of requesting the execution of the service FAA are the same among the second to fourth devices 12 to 14. In such a case, the execution units 104 of the second to fourth devices 12 to 14 execute the service FAA (ACT 106). In such a case, as an example, the first device 11 adopts the firstly published topic AA. For example, in the example illustrated in FIG. 12, when the topic AA is published in the order of the second device 12 and the third device 13, the first device 11 adopts the topic AA published from the second device 12.

As illustrated in FIG. 12, each information processing device 10 (fourth device 14) before publishing the topic AA is triggered by the reception of the topic AA from another information processing device 10 to stop publishing the topic AA from its own device. When the service FAA is being executed, each information processing device 10 (fourth device 14) before publishing the topic AA is triggered by the reception of the topic AA from another information processing device 10 to stop executing the service FAA in its own device.

As described above, according to the information processing device 10 of the second embodiment, even if the service is executed by a plurality of information processing devices 10, the distributed processing of the service using the data sharing system can be realized. That is, as in the first embodiment, it is possible to further reduce the functions to be installed on the embedded device. The information processing device 10 according to the second embodiment is triggered by the reception of a topic including an execution result from another information processing device 10 to stop the publication of a topic including an execution result from its own device or the execution of a service in its own device. Therefore, according to the information processing device 10 of the second embodiment, when the execution of the service by any one of the information processing devices 10 is completed, the resources of each information processing device 10 can be released for the execution of the other service.

Third Embodiment

Figure 13:
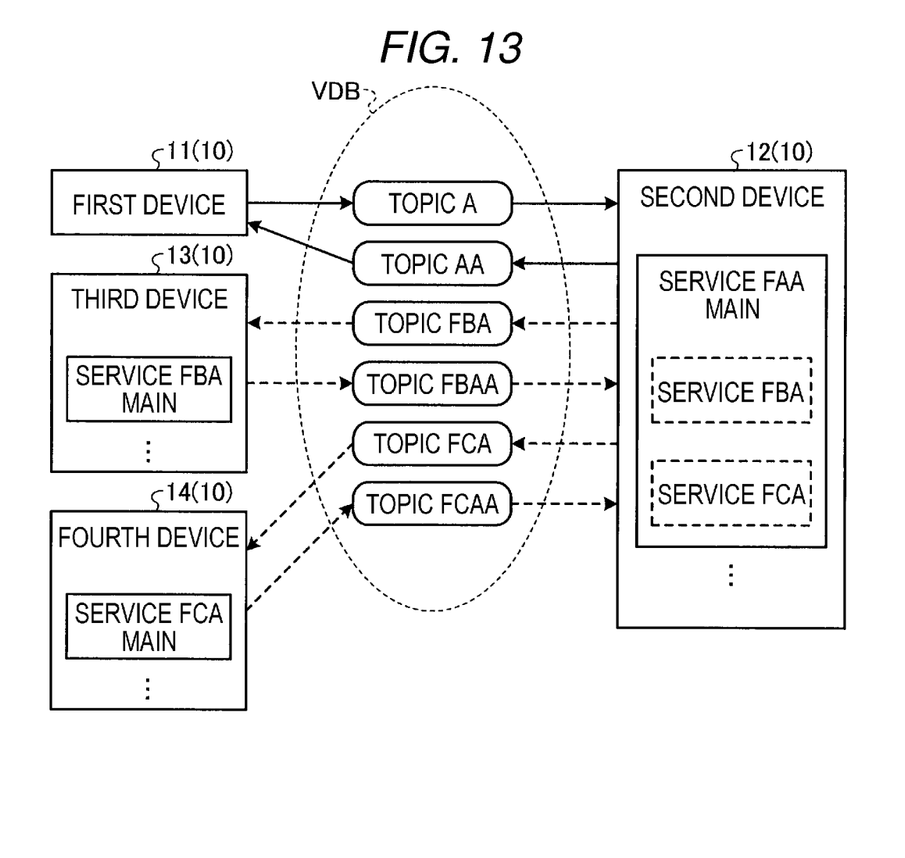
FIG. 13 is a diagram for illustrating a case where a requested service cannot be executed by a single information processing device in the information processing system.

In the first and second embodiments, the case where the service FAA requested by the first device 11 can be executed by a single information processing device 10 such as the second device 12 was described, but the present disclosure is not limited thereto. One requested service FAA may be executed by a plurality of information processing devices 10. FIG. 13 is a diagram for illustrating a case where the requested service FAA cannot be executed by a single information processing device 10 in the information processing system 1 according to the embodiment.

In the example illustrated in FIG. 13, the service FAA is assumed to be a service that is executed by further using the execution result of a service FBA and the execution result of a service FCA. The third device 13 is assumed to be an information processing device 10 capable of executing at least one service including the service FBA. The fourth device 14 is assumed to be an information processing device 10 capable of executing at least one service including the service FCA. The number of services that each information processing device 10 can execute is any number. Here, the service FBA and the service FCA are examples of the second service. The execution result of the service FBA and the execution result of the service FCA are examples of the second execution result.

The publication unit 105 of the second device 12 publishes a topic FBA (shared data) including an execution request for requesting the execution of the service FBA and a parameter used for the execution of the service FBA when the service FAA can be executed and the service FBA cannot be executed. Similarly, when the publication unit 105 of the second device 12 publishes a topic FCA (shared data) including an execution request for requesting the execution of the service FCA and a parameter used for the execution of the service FCA when the service FAA can be executed and the service FCA cannot be executed. Here, the parameter used for executing the service FBA and the parameter used for executing the service FCA are examples of the second parameters. The topic FBA and the topic FCA are examples of third shared data.

The reception unit 101 of the third device 13 receives the topic FBA. The execution unit 104 of the third device 13 executes the service FBA. The publication unit 105 of the third device 13 publishes a topic FBAA including the execution result of the service FBA. Similarly, the reception unit 101 of the fourth device 14 receives the topic FCA. The execution unit 104 of the fourth device 14 executes the service FCA. The publication unit 105 of the fourth device 14 publishes a topic FCAA including the execution result of the service FCA. Here, the topic FBAA and the topic FCAA are examples of fourth shared data.

The reception unit 101 of the second device 12 receives the topic FBAA and the topic FCAA and executes the service FAA by further using the execution result of the service FBA and the execution result of the service FCA. After that, the publication unit 105 of the second device 12 publishes the topic AA including the execution result of the service FAA, as described above.

The above-mentioned service FBA and service FCA are not limited to services that can be processed in parallel. For example, the topic FCA including the execution request of the service FCA may include the execution result of the service FBA as a parameter.

As such, the information processing device 10 according to the third embodiment requests a service regarding insufficient processing to another information processing device 10 when the requested service cannot be executed by its own device alone. Here, the case where the requested service cannot be executed by its own device alone includes a case where a part of the requested service is not installed in the information processing device 10 that received the service execution request. The case where the requested service cannot be executed by its own device alone includes a case where the function (processing capability) alone implemented in the information processing device 10 that received the service execution request is insufficient to execute the requested service. Accordingly, even if the requested service cannot be executed by a single information processing device 10, the requested service can be appropriately executed. That is, as compared to the first embodiment and the second embodiment, it is possible to further reduce the functions to be installed in the embedded device.

In each of the above-described embodiments, the information processing device 10 that determines whether to execute the service requested to be executed in its own device, based on the processing capability and the priority of its own device was exemplified, but the present disclosure is not limited thereto. For example, the determination unit 102 of each information processing device 10 may determine whether to execute the service requested to be executed in its own device, based on only the processing capability of its own device, regardless of the priority. In the information processing system 1, for example, when the types of services that can be executed by all the information processing devices are the same (similar level), the function as the determination unit 102 may not be provided. Therein, the service FAA may be executed by all the information processing devices 10 capable of executing the service FAA according to the topic A. The information processing device 10 that requested the service FAA may adopt, for example, the execution result of the earliest published topic AA, as in the above embodiment. With such configuration, the execution speed of each service can be increased to the maximum speed at that time.

Each topic may include information such as service types for classifying services. For example, the type of service to be responded is preset for each information processing device 10 and the type of service is designated in the topic to be published, thereby enabling to reduce the processing amount in the information processing device 10 that does not need to respond to the designated type. That is, for example, in a situation where a plurality of topics related to a plurality of services that are not related to each other are published in parallel, the processing capability of the information processing system 1 as a whole can be improved.

First Application Example

Figure 14:
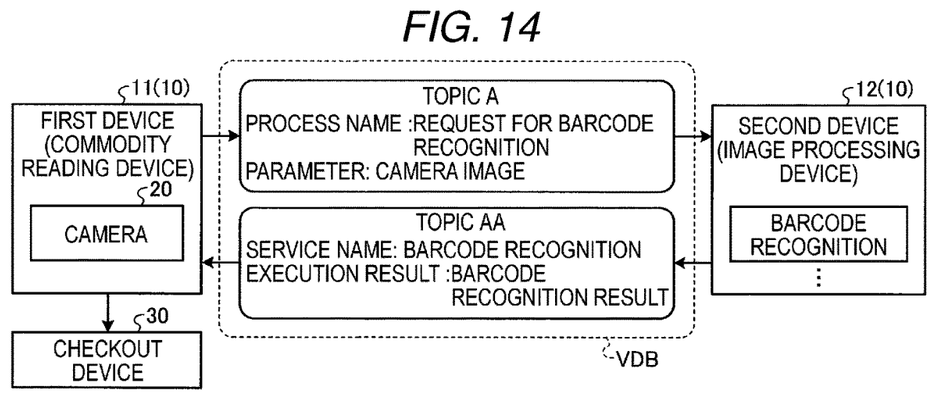
FIG. 14 is a diagram for illustrating an application example of the information processing system.

The information processing system 1 according to the embodiment can be applied to, for example, a commodity sales data processing system. FIG. 14 is a diagram for illustrating an application example of the information processing system 1 according to the embodiment.

In the example illustrated in FIG. 14, the first device is a commodity reading device that reads commodity information regarding commodities. The commodity reading device further includes a camera 20 as a unique function unit. The camera 20 generates image data (camera image) that images a commodity. The second device 12 is an image processing device capable of executing at least a barcode recognition function (service FAA).

The commodity reading device (first device 11) publishes the topic A including a camera image (parameter) and a barcode recognition request, that is, an execution request of a barcode recognition function (service FAA) based on the camera image.

After receiving the topic A, the image processing device (second device 12) executes the barcode recognition function by using the camera image and publishes the topic AA including the execution result of the barcode recognition function (barcode recognition result).

By receiving the topic AA, the commodity reading device can read the commodity information regarding the commodity. Then, the commodity reading device generates a commodity registration file in which the commodity information is registered, based on the barcode recognition result and the commodity master. A checkout device 30 performs payment processing related to the payment of one transaction based on the commodity registration file supplied from the commodity reading device.

Second Application Example

Figure 15:
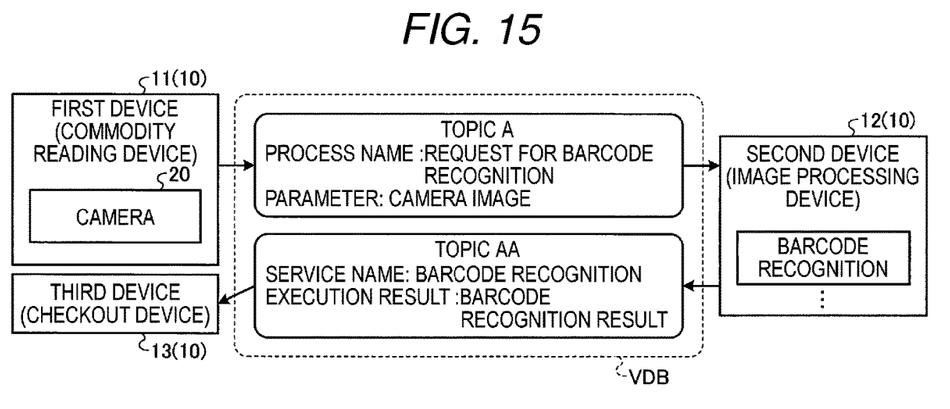
FIG. 15 is a diagram for illustrating an application example of the information processing system.

The information processing device 10 that publishes the topic A and the information processing device 10 that receives the topic AA may be a different information processing device 10. FIG. 15 is a diagram for illustrating an application example of the information processing system 1 according to the embodiment. In the example shown in FIG. 15, unlike the first application example, the checkout device (third device 13) receives the topic AA.

Third Application Example

The camera 20 may be provided outside the commodity reading device (first device 11). That is, the commodity sales data processing system (information processing system 1) may further include the camera 20 (fourth device 14). As an example, the camera 20 may be configured to publish the topic A including a camera image (parameter) and a barcode recognition request by capturing an image in a predetermined cycle set in advance or by capturing an image triggered by the output of a sensor that detects the approach of a commodity. As another example, the camera 20 is configured to capture an image according to the reception of a topic including a request to execute the image capturing function and publish the topic A. Here, the commodity sales data processing system may further include a sensor (information processing device 10) that is configured to publish a topic including a request to execute the image capturing function and detects the approach of the commodity.

Fourth Application Example

Although the barcode recognition function is exemplified as the service FAA, the present disclosure is not limited thereto. The service FAA may be a function of recognizing a code symbol other than a barcode, such as a two-dimensional code, which is attached to a commodity, or a function of recognizing a digital watermark attached to a commodity, or may be an object recognition function performed by extracting feature data of a commodity.

The technology according to the third embodiment can be applied to the above-described commodity sales data processing system. For example, the second device 12 is the information processing device 10 capable of executing the object recognition function (service FAA). Here, the object recognition function is assumed to be a service executed by using the execution result of the image binarization function (service FBA) and the execution result of the edge detection function (service FCA) based on the binarized image.

The second device 12 receives the topic A including image data (parameter) from the camera 20 and an object recognition request (execution request). If the second device 12 cannot execute the binarization function, the second device 12 publishes the topic FBA including the image data as a parameter and the execution request of the binarization function and receives the topic FBAA including the execution result of the binarization function. After that, when the second device 12 cannot execute the edge detection function, the second device 12 publishes the topic FCA including the execution result (image data) of the binarization function as a parameter and the execution request of the edge detection function and receives the topic FCAA including the execution result of the edge detection function. Then, the second device 12 executes the object recognition based on the execution result of the edge detection function and publishes the topic AA including the result of object recognition.

As described above, by applying the technology according to each embodiment, it is possible to realize a distributed processing system that provides a service among a plurality of information processing devices 10 without designating a connection destination and thus, automatic detection, addition and deletion of a device can be performed easily.

As described above, according to the first to third embodiments, it is possible to receive a service provided from another device without designating a connection destination in advance.

The information processing device 10 of the present embodiment includes a control device such as a CPU, a storage device such as a ROM and a RAM, an external storage device such as an HDD and a CD drive device, a display device, and an input device such as a keyboard and a mouse, and has a hardware configuration using a general purpose computer.

The control program 121 executed by the information processing device 10 of the present embodiment is recorded and provided on a computer-readable recording medium, such as a CD-ROM, a flexible disk (FD), a CD-R, a digital versatile disk (DVD), or the like in a file in an installable format or an executable format.

The control program 121 executed by the information processing device 10 of the present embodiment may be configured to be stored in a computer connected to a network such as the Internet and provided by being downloaded via the network. The control program 121 executed by the information processing device 10 according to the present embodiment may be configured to be provided or distributed via a network such as the Internet.

The control program 121 executed by the information processing device 10 according to the present embodiment may be configured to be incorporated in a ROM or the like in advance and provided.

The control program 121 executed by the information processing device 10 of the present embodiment has a module configuration including the above-described units (the reception unit 101, the determination unit 102, the storage unit 103, the execution unit 104, and the publication unit 105). The CPU (processor) reads the control program 121 from the storage medium and loads the above units onto the main storage device. As a result, the reception unit 101, the determination unit 102, the storage unit 103, the execution unit 104, and the publication unit 105 are generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device that shares shared data with another information processing device by exchanging the shared data that does not designate a transmission destination with the other information processing device, the information processing device comprising a processor configured to:
receive first shared data including a first parameter and an execution request for requesting the execution of a first service using the first parameter;
output a first execution result by executing the first service according to the first shared data; and
publish second shared data including the first execution result.

2. The information processing device according to claim 1, wherein the processor is further configured to:
determine whether the first service received by the reception component can be executed, and
execute the first service when the first service can be executed.

3. The information processing device according to claim 2, wherein
the first service is executed by further using a second execution result obtained by executing a second service using a second parameter,
and wherein the processor is further configured to:
publish third shared data including the second parameter and an execution request for requesting the execution of the second service when the first service can be executed and the second service cannot be executed, and receive fourth shared data including the second execution result.

4. The information processing device according to claim 2, wherein the processor is further configured to:
receive fifth shared data, which is published from the other information processing device capable of executing the first service and includes information indicating a priority regarding the execution of the first service,
determine whether to execute the first service based on the fifth shared data, and
publish the fifth shared data with the priority changed to be lower than that before the execution of the first service during or after the execution of the first service.

5. The information processing device according to claim 1, wherein the information processing device is a commodity reading device that reads a code symbol attached to a commodity or a digital watermark based on image data.

6. The information processing device according to claim 1, wherein the information processing device is a commodity reading device that reads information regarding a commodity by extracting feature data of the commodity and performing object recognition.

7. The information processing device according to claim 1, wherein the execution result is information indicating a success or failure of the image recognition.

8. An information processing system that shares shared data among a plurality of information processing devices by exchanging the shared data that does not designate a transmission destination among the plurality of information processing devices, the information processing system comprising:
a first processor configured to publish first shared data including a first parameter and an execution request for requesting the execution of a first service using the first parameter; and
a second processor configured to receive the first shared data, execute the first service according to the first shared data, and publish second shared data including a first execution result obtained by the execution of the first service.

9. The information processing system according to claim 8, the first processor is further configured to:
determine whether the first service can be executed, and
execute the first service when the first service can be executed.

10. The information processing system according to claim 9, wherein
the first service is executed by further using a second execution result obtained by executing a second service using a second parameter, and
wherein the first processor is further configured to:
publish third shared data including the second parameter and an execution request for requesting the execution of the second service when the first service can be executed and the second service cannot be executed, and
receive fourth shared data including the second execution result.

11. The information processing system according to claim 9, wherein the first processor is further configured to:
receive fifth shared data, which is published from the other information processing device capable of executing the first service and includes information indicating a priority regarding the execution of the first service,
determine whether to execute the first service based on the fifth shared data, and
publish the fifth shared data with the priority changed to be lower than that before the execution of the first service during or after the execution of the first service.

12. The information processing system according to claim 8, wherein the first processor is a commodity reading device that reads a code symbol attached to a commodity or a digital watermark based on image data.

13. The information processing system according to claim 8, wherein the first processor is a commodity reading device that reads information regarding a commodity by extracting feature data of the commodity and performing object recognition.

14. An information processing method executed by an information processing device that shares shared data with another information processing device by exchanging the shared data that does not designate a transmission destination with the other information processing device, the information processing method comprising:
receiving first shared data including a first parameter and an execution request for requesting the execution of a first service using the first parameter,
outputting a first execution result by executing the first service according to the first shared data; and
publishing second shared data including the first execution result.

15. The information processing method according to claim 14, further comprising:
determining whether the first service received can be executed; and
executing the first service when the first service can be executed.

16. The information processing method according to claim 15, further comprising:
using a second execution result obtained by executing a second service using a second parameter;
publishing third shared data including the second parameter and an execution request for requesting the execution of the second service when the first service can be executed and the second service cannot be executed; and
receiving fourth shared data including the second execution result.

17. The information processing method according to claim 15, further comprising:
receiving fifth shared data, which is published from the other information processing device capable of executing the first service and includes information indicating a priority regarding the execution of the first service;
determining whether to execute the first service based on the fifth shared data; and
publishing the fifth shared data with the priority changed to be lower than that before the execution of the first service during or after the execution of the first service.

18. The information processing method according to claim 14, wherein the information processing device is a commodity reading device, further comprising:
reading a code symbol attached to a commodity or a digital watermark based on image data.

19. The information processing method according to claim 14, wherein the information processing device is a commodity reading device, further comprising:
reading information regarding a commodity by extracting feature data of the commodity and performing object recognition.

20. The information processing method according to claim 14, further comprising:

indicating a success or failure of the image recognition.

\* \* \* \* \*